United States Patent [19]

Kim

[11] Patent Number: 5,272,423
[45] Date of Patent: Dec. 21, 1993

[54] VELOCITY CONTROL METHOD FOR A SYNCHRONOUS AC SERVO MOTOR

[75] Inventor: Dong-Il Kim, Seoul, Rep. of Korea

[73] Assignee: Samsung Electronics Co., Ltd., Suwon City, Rep. of Korea

[21] Appl. No.: 825,257

[22] Filed: Jan. 24, 1992

[30] Foreign Application Priority Data

Jan. 26, 1991 [KR] Rep. of Korea .................. 91-1348

[51] Int. Cl.$^5$ .............................................. G05B 13/00
[52] U.S. Cl. ..................................... 318/560; 318/609; 318/615; 318/616
[58] Field of Search ............... 318/609, 610, 800, 803, 318/802, 806, 808, 560, 615, 616, 568.2

[56] References Cited

U.S. PATENT DOCUMENTS

| | | | |
|---|---|---|---|
| 4,509,003 | 4/1985 | Ohnishi et al. | 318/800 |
| 4,611,159 | 9/1986 | Kurakake et al. | 318/803 |
| 4,701,839 | 10/1987 | McNally et al. | 318/715 |
| 4,893,293 | 6/1989 | Futami | 318/609 |
| 4,908,556 | 3/1990 | Daggett et al. | 318/568.2 |
| 5,073,747 | 12/1984 | Dupraz et al. | 318/609 |
| 5,093,609 | 3/1992 | Sakamoto et al. | 318/610 |
| 5,107,193 | 4/1992 | Iwashita | 318/560 |
| 9,914,365 | 4/1990 | Murakami et al. | 318/610 |

Primary Examiner—William M. Shoop, Jr.
Assistant Examiner—John W. Cabeca
Attorney, Agent, or Firm—Burns, Doane, Swecker & Mathis

[57] ABSTRACT

The present invention relates to a velocity control method for a synchronous ac servo motor, more particularly, to a velocity control method for an ac servo motor, in which the motor is controlled by an acceleration control mode and a feedforward control mode in systems having severe external load torque and inertia, such as robots, computer numerical control machine tools and the like, to thereby attain a rapid response characteristic and a powerful property endurable to the variation of the load torque and inertia. The method comprises the steps of calculating acceleration from a sensor attached to the synchronous ac servo motor and feeding back the calculated acceleration to an output of a PI controller, and multiplying velocity command data input value by an optimum gain value and feeding forward the multiplied result to the output of the PI controller, thereby minimizing an effect due to the variation of load torque and inertia according to a position and a moving speed of a robot arm and the weight of objects grasped by the robot.

5 Claims, 1 Drawing Sheet

VELOCITY CONTROL METHOD FOR A SYNCHRONOUS AC SERVO MOTOR

BACKGROUND OF THE INVENTION

1. Field of the Invention

The present invention relates to a velocity control method for a synchronous ac servo motor,. more particularly, which a system in the motor is controlled by an acceleration control mode and a feedforward control mode in systems with severe external load torque and inertia, such as robots, computer ,numerical control machine tools and the like, to thereby attain a rapid response characteristic and to minimize the effects from the variation of the load torque and inertia.

2. Description of the Prior Art

Recently, synchronous ac servo motors have been widely employed in industries requiring high performance, such as industrial robots, CNC machine tools and/or the like.

In an industrial robot, however, load torque and inertia are varied due to the variations of the position and the moving speed of the robot arm and the weight of objects to be grasped by the robot, and, hence, an ac servo motor control unit of respective joints of the robot is disadvantageously affected due to the aforementioned variations. Accordingly, there is a problem normal operation of that the robot is likely to be interfered.

Therefore, an ac servo motor control unit has been developed which is prinimally affected by the variation of the parameters, for example, load torque and inertia.

For example, a dc motor is controlled by using an acceleration control method instead of an ordinary current control method in order to embody a powerful control unit. But, since an ac servo motor must be supplied with a three-phase sine wave current unlike to the dc motor, the current control method cannot be subsituted for the acceleration control method in the ac servo motor. Also, the acceleration control represents a powerful property against the variation of the load torque, but it is slow in a response velocity.

Referring to FIG. 1 (a), there is shown a conventional PID (Proportional Integral Differential) controller disclosed in U.S patent publication No. 4,509,003.

Now, the operation of the conventional PID controller shown in FIG. 1 (a) will be described.

Firstly, if the velocity command Wr is supplied to the controller, the command Wr is differentiated by means of a differential controller 1 and supplied to a summer G1. Consequently, the summer G1 compares the velocity command Wr with the actual velocity data W of a motor (not shown) to produce a deviation value A between the data Wr and the data W. The deviation value A is amplified by a PI controller 2 and the amplified value A is then supplied to a summer G2. As a result, the summer G2 produces the control which, in turn, is supplied to an object to be controlled. The PID controller is simply shown in FIG. 1 (b).

With the conventional PID control method as described above however; it is difficult to organically adjust a proportional-controlled gain, an integral-controlled gain and a differential-controlled gain. As a result, there are problems in that the response characteristic is very deteriorated and it may be affected seriously according to the variation of the parameters, for example, load torque and inertia.

SUMMARY OF THE INVENTION

Accordingly, the present invention has been made in consideration of the above-mentioned problems and an object of the present invention is to provide a velocity control method for a synchronous ac servo motor, in which a current control method is employed, and by which the acceleration information is fedback to an output of a PI (Proportional Integral) controller and a velocity command is fedforward to the output of the PI controller thereby attaining a rapid response characteristic of the ac servo motor and minimizing an effect due to the variation of parameters such as load torque, inertia and/or the like.

In order to achieve the above-mentioned object, the present invention provides a velocity control method for a synchronous ac servo motor, which comprises the steps of calculating acceleration from a sensor attached to the synchronous ac servo motor and feeding back the calculated acceleration to an output of a PI controller and, multiplying velocity command data input value by an optimum gain value and feeding forward the multiplied result to the output of the PI controller, thereby minimizing an effect due to the variation of load torque and inertia according to the variation of the position and the moving speed of a robot arm and the weight of objects grasped by the robot.

The above and other objects, features and advantages of the present invention will be apparent from the following description to be understood with reference to the accompanying drawings.

DETAILED DESCRIPTION OF THE PREFERRED EMBODIMENTS

The present invention will be described hereinafter with reference to the accompanying drawings.

Figure 2:
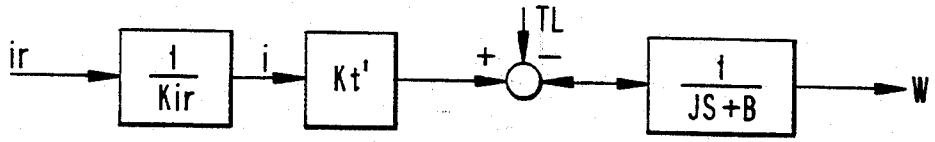
FIG. 2 is a block diagram of a synchronous ac servo motor which is controlled by using a current control method ; and, FIG. 3 is a block diagram of a system in which a velocity control method of a synchronous ac servo motor according to the present invention is applied.
Figure 3:
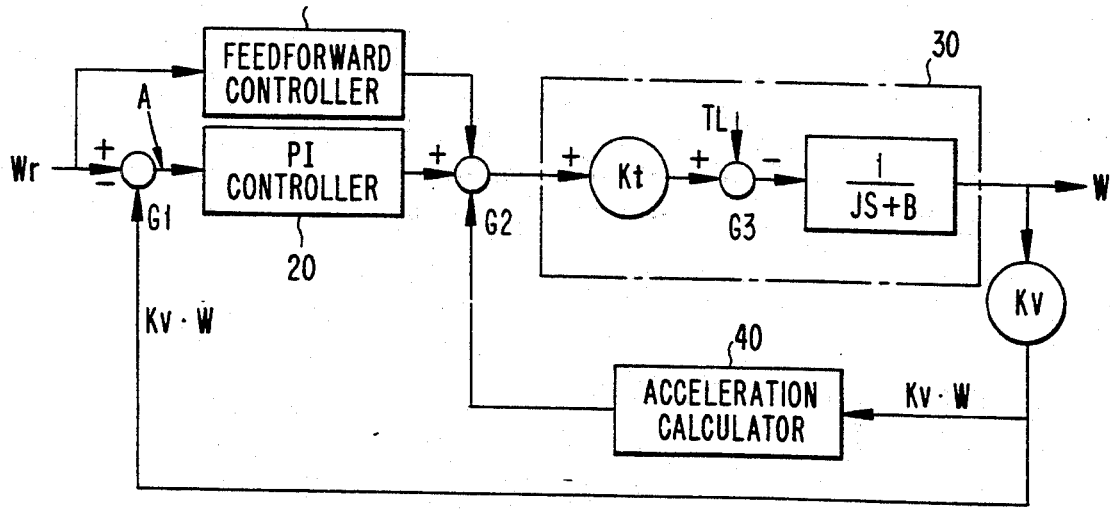

FIG. 2 is a block diagram of a synchronous ac servo motor which is controlled by using a current control method and FIG. 3 is a block diagram of a system in which a velocity control method for a synchronous ac servo motor according to the present invention is applied.

Referring to FIG. 2, there is shown the block diagram of the synchronous ac servo motor which is controlled by a current controller so that no difference is generated in a phase and magnitude between the current command and the actual current in an excessive state and a normal state when a hysteresis current controller or a high gain current controller is employed as the current controller.

In FIG. 3, reference numeral 10 denotes a feedforward controller for multiplying a velocity command Wr by an optimum gain value and feeding forward the multiplied result to a summer G2 which will be described later, 20 denotes a PI (Proportional Integral) controller for summing the velocity command Wr with a velocity feedback constant and amplifying the deviation A obtained as the summed result. Reference numeral 40 denotes an acceleration calculator for calculating acceleration of the motor 30 on the basis of the present velocity data W of the motor 30 and the velocity feedback constant Kv and feeding back the calculated acceleration data to the output of the PI controller 20.

The motor 30 shown in FIG. 3 may be employed with the motor in which the current is controlled as shown in FIG. 2.

With the velocity control system of the synchronous ac servo motor according to the present invention constructed as described above, the current control method as shown in FIG. 2 is adopted. The acceleration information is fedback to the output of the PI controller 20 while the velocity command value is fed forward to the output of the PI controller 20, so that the response characteristic of the ac servo motor can be rapidly obtained and a the effect of the variations of the load torque and inertia can be minimized.

In a system requiring minimization of to the variation of the load torque and inertia, it is possible to decrease the effect of such variations by using an acceleration control method, but the response velocity is entirely decreased.

More particularly, the feedback of the acceleration suppresses the variation of velocity. Therefore, if the velocity command is supplied to the system, the velocity command tracing variation is also suppressed thereby decreasing the entire response velocity.

To this end, it may be considered that an enhanced proportional gain method may be adopted in order to prevent the decrease of the response velocity. In this case, however, since the system may be unstably operated due to restriction in hardware and noises may be occur therein, it is impossible to infinitely increase the proportional gain.

According to the present invention, a control system is provided with a feedforward controller to achieve the desired purpose in relation to the afore-mentioned situation.

The control system using the feedforward controller will be described hereinafter with reference to FIG. 3.

FIG. 3 shows the operation route of the velocity control system for controlling the synchronous ac servo motor.

Firstly, when the velocity-command Wr required to normally drive the robot is supplied to the motor velocity control system shown in FIG. 3, the velocity command Wr is delivered to a summer G2 through a feedforward controller 10 to detect the variation of conditions before it affects the entire control system.

Meanwhile, the velocity command Wr is compared at a summer G1 with the value obtained by multiplying the actual velocity output data W by the velocity feedback constant Kv to determine the deviation between the actual motor speed for driving the robot and the velocity command Wr representing the normal motor drive speed.

If the result obtained from the summer G1 represents that the deviation A has occurred, the deviation A is supplied to the PI controller 20 thereby to perform the proportional and integral control, that is, to amplify the deviation A.

The actual velocity data of the motor 30 is multiplied by a velocity feedback constant Kv and fedback to the summer G1. At this time, the multiplied result is also supplied to an acceleration calculator 40 to calculate acceleration of the motor 30. After that, the calculated acceleration is supplied to the summer G2. More particularly, the acceleration is calculated from the motor speed obtained by a sensor such as a tachogenerator, an encoder or a resolver attached to the motor and fedback to the output of the PI controller 20.

The summer G2 then sums data supplied from the feedforward controller 10, data from the PI controller 20 and data from the acceleration calculator 40 and then the summed result is supplied to the motor 30.

The result obtained from the summer G2 is multiplied by a torque constant Kt and supplied to a summer G3 which sums the multiplied result to external torque disturbance value TL for stopping the motor 30. The deviation thus obtained is applied to control the motor and generate the actual velocity data W from the motor 30.

Meanwhile, a transfer function W(S) / Wr(S), A(S) / Wr(S) and W(S) / TL(S) in FIG. 2 will be expressed as the following :

$$W(S) / Wr(S) = Kt\,Kv\,Kf / Kt\,Kv\,Ka + J \cdot S^2 + KpS/Kf + Ki/Kf / G(S) \quad (1)$$

$$A(S) / Wr(S) = Kt\,Kv\,(Ka - Kf) + J / Kt\,Kv\,Ka + J \cdot B\,(S + B / (Kt\,Kv\,(Ka - Kf) + J)) / G(S) \quad (2)$$

$$W(S) / TL(S) = 1 / Kt\,Kv\,Ka + J \cdot B / G(S) \quad (3)$$

wherein, S denotes a Laplace's operator, that is, a differential operator, $G(S)$ is set to $S^2 + (Kt\,Kv\,Kp + B)\,S / (Kt\,Kv\,Ka + J) + Kt\,Kv\,Ki / (Kt\,Kv\,Ka + J)$, $Kf$ denotes the feedforward constant, $Kt$ denotes the torque constant, $J$ denotes a moment of inertia, $B$ denotes a damping coefficient, $Kv$ denotes the velocity feedback gain and $Ka$ denotes the acceleration constant.

Moreover, when the velocity command data Wr is given as a unit step, the setting time ts will be expressed as the following :

$$ts = 6\,(Kt\,Kv\,Ka + J) / Kt\,Kv\,Kp + B \quad (4)$$

wherein, $Kp$ denotes a proportional coefficient.

The transfer function expressed by the equations (2) and (3) will be expressed as the following polynomial $$A(S) / Wr(S) = C1 \cdot N1(S) / N1'(S) \quad (5)$$

$$W(S) / TL(S) = C2 \cdot N2(S) / N2'(S) \quad (6)$$

wherein, N1(S), N2(S), N1'(S) and N2'(S) denote monic polynomial, respectively.

meanwhile, C1 and C2 will be given as the following :

$$C1 = Kt\,Kv\,(Ka - Kf) + J / Kt\,Kv\,Ka + J \quad (7)$$

$$C2 = / Kt\,Kv\,Ka + J \quad 8)$$

Figure 1A:
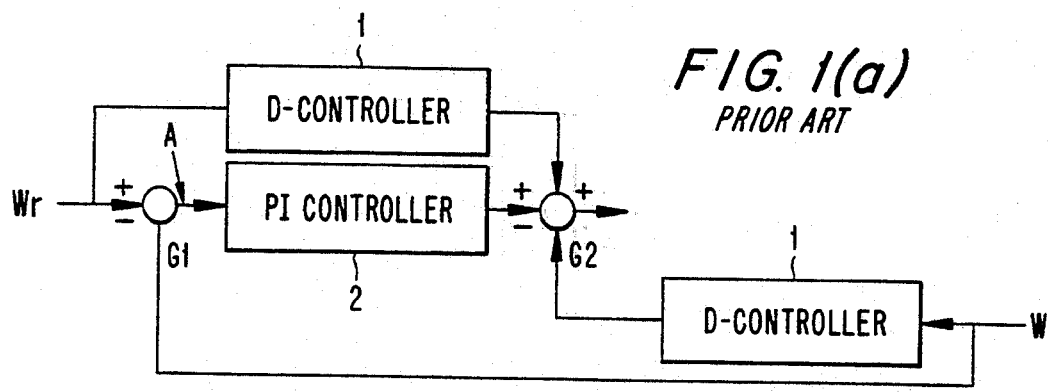
FIG. 1 is a block diagram of a conventional PID (Proportional Integral Differential) controller.
Figure 1B:
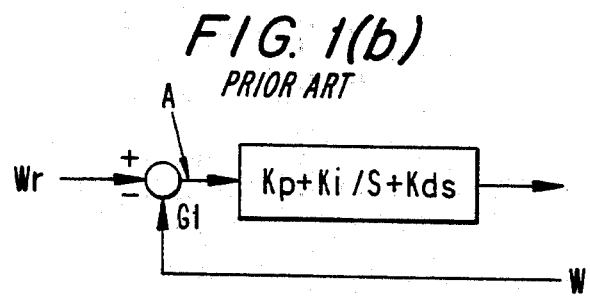

In the present invention, when the feedforward constant Kf and the acceleration constant Ka are equal to each other, that is, Kf = Ka, the arrangement is equal to that of the conventional PID controller as shown in FIG. 1.

The present invention in that the feedforward controller and the acceleration controller are adopted is different in C1 from that of the PID controller shown in FIG. 1.

More particularly, since the feedforward control constant Kf in the feedforward controller and the acceleration controller is set to $Ka + J/Kt\,Kv$ and, hence, C1 is set to zero, it is possible to obtain an excellent characteristic in comparison with the PID controller.

As described above, according to the velocity control method for synchronous ac servo motor, it is possible to ensure the rapid response characteristic Further, any effect due to variations of the load torque and inertia is minimized to achieve the normal operation of the robot with improved operation efficiency.

What is claimed is:

1. A velocity control method for a motor comprising the steps of:
    sensing velocity of the motor;
    determining acceleration of the motor based on said velocity;
    comparing said velocity and a command velocity to determine a velocity deviation;
    multiplying said command velocity by a gain value to generate a modified command velocity; and
    generating a control signal for said motor based on said acceleration, said velocity deviation and said modified command velocity.

2. An apparatus for controlling velocity of a motor comprising:
    means for sensing velocity of the motor;
    means for determining acceleration of the motor based on said velocity;
    means for comparing said velocity and a command velocity to determine a velocity deviation;
    means for multiplying said command velocity by a gain value to generate a modified command velocity; and
    means for generating a control signal for said motor based on said acceleration, said velocity deviation and said modified command velocity.

3. The apparatus of claim 2 wherein said sensing means is one of a tachogenerator, an encoder and a resolver.

4. The apparatus according to claim 2 wherein said determining means includes a proportional integral controller.

5. An apparatus for controlling velocity of a motor comprising:
    means for receiving present velocity data of the motor and multiplying said present velocity data by a feedback constant to obtain a velocity feedback value;
    a feedforward controller for multiplying a velocity command by an optimum gain value to obtain a multiplied result and feeding forward said multiplied result;
    means for determining a deviation by comparing said velocity command with said velocity feedback value and amplifying said deviation;
    an acceleration calculator for calculating acceleration of the motor based on said velocity feedback value and feeding back said acceleration; and
    a summer for comparing said acceleration as fed back, said multiplied result from said feedforward controller, and said amplified deviation and generating a motor control signal.

* * * * *